United States Patent [19]
Arnold et al.

[11] Patent Number: 5,475,677
[45] Date of Patent: Dec. 12, 1995

[54] COMPATIBLE LICENSED AND UNLICENSED BAND PORTABLE HANDSET UNIT FOR TDMA WIRELESS COMMUNICATIONS SYSTEM

[75] Inventors: Hamilton W. Arnold, Neptune; Li F. Chang, Holmdel; Anthony R. Noerpel, Long Branch; Nelson R. Sollenberger, Tinton Falls; Robert A. Ziegler, Middletown, all of N.J.

[73] Assignee: Bell Communications Research Inc., Livingston, N.J.

[21] Appl. No.: 366,944

[22] Filed: Dec. 29, 1994

[51] Int. Cl.[6] .............................. H04B 1/56; H04J 4/00; H04L 5/14

[52] U.S. Cl. .................. 370/29; 370/30; 370/50; 370/69.1; 370/95.3; 379/58; 455/34.2; 455/89

[58] Field of Search ................... 370/24, 29, 30, 370/50, 69.1, 77, 79, 95.1, 95.3; 375/344, 347; 379/58, 61, 63; 455/34.1, 34.2, 49.1, 53.1, 54.1, 73, 74, 75, 76, 78, 79, 88, 89

[56] References Cited

U.S. PATENT DOCUMENTS

| | | | |
|---|---|---|---|
| 4,849,991 | 7/1989 | Arnold et al. | 375/330 |
| 4,937,841 | 6/1990 | Chuang et al. | 375/340 |
| 4,941,155 | 7/1990 | Chuang et al. | 375/330 |
| 5,025,442 | 6/1991 | Lynk et al. | 370/29 |
| 5,038,342 | 8/1991 | Crisler et al. | 370/50 |
| 5,084,891 | 1/1992 | Ariyavisitakul et al. | 371/42 |
| 5,124,985 | 6/1992 | Hoshikawa | 370/95.3 |
| 5,155,742 | 10/1992 | Ariyavisitakul et al. | 375/231 |
| 5,177,769 | 1/1993 | Arnold et al. | 375/296 |
| 5,212,831 | 5/1993 | Chuang et al. | 455/54.1 |
| 5,226,045 | 7/1993 | Chuang | 370/95.3 |
| 5,260,944 | 11/1993 | Tomabechi | 370/95.1 |
| 5,267,233 | 11/1993 | Bauerschmidt | 370/29 |
| 5,327,578 | 7/1994 | Breeden et al. | 455/34.2 |
| 5,333,175 | 7/1994 | Ariyavisitakul et al. | 379/58 |
| 5,363,375 | 11/1994 | Chuang et al. | 370/95.3 |
| 5,363,376 | 11/1994 | Chuang et al. | 370/95.3 |
| 5,428,601 | 6/1995 | Owen | 370/29 |

*Primary Examiner*—Alpus Hsu
*Attorney, Agent, or Firm*—Leonard Charles Suchyta; James W. Falk

[57] ABSTRACT

In a TDM/TDMA portable radio communications system, a portable handset is compatible for operation in both a frequency-division duplexing (FDD) mode for communication in the licensed portion of the Emerging Technologies frequency band, and in a time-division duplexing (TDD) mode for communication in the unlicensed portion of the Emerging Technologies frequency band. In the FDD mode, different frequencies are used to separate a downlink transmission to a portable from a port from an uplink transmission from a port to a portable. In the TDD mode, uplink and downlink transmissions are separated in different time-slots, but at the same frequency. The handset includes common transmit and receive circuitry that operates at fixed IF frequencies that are separated in frequency by the fixed FDD frequency difference between corresponding uplink and downlink signals. In the FDD mode, therefore, a frequency synthesizer (301), which is used to tune to transmit and receive at different frequencies from different ports, does not have to switch its frequency between transmitting and receiving a burst to and from a single port. In the TDD mode, however, even though uplink and downlink signals are at the same frequency, the synthesizer is switched in frequency between transmitting uplink and receiving downlink.

14 Claims, 6 Drawing Sheets

COMPATIBLE LICENSED AND UNLICENSED BAND PORTABLE HANDSET UNIT FOR TDMA WIRELESS COMMUNICATIONS SYSTEM

BACKGROUND OF THE INVENTION

This invention relates to wireless personal portable communications systems and more particularly, to a portable handset unit for use in such a system that is compatible for operation in two different frequency bands that by their nature require separate modes of operation.

*The New York Times*, on page 1 of the Business Day section, on Monday, Dec. 5, 1994, reported an auction to take place that day for "99 licenses to use the radio spectrum for 'personal communication services,' a new family of wireless telephone and data services. . . . [T]he total of the winning bids is expected to be somewhere between $3 billion and $15 billion." The article quotes Reed E. Hundt, chairman of the Federal Communications Commission (FCC) as saying: "This auction represents the largest one-time launching of a start-up industry in American's peacetime history." For each geographical area, licenses will be granted to allow the provision of personal communications services in lower and upper frequency bands of 1850–1910 MHz and 1930–1990 MHz. Licenses to service providers will be for either a pair of 15 MHz or 5 MHz wide subbands, the first subband in each pair being in the lower frequency band and the second subband of the pair being in the upper frequency band, separated from the first by 80 MHz.

The FCC allocated such frequencies in what is known as the Emerging Technologies (ET) Band in the *FCC Second Report and Order*, "Amendment of the Commission's Rules to Establish New Personal Communications Services", Oct. 22, 1993, GEN Docket No. 90-314, and in the *FCC Memorandum Opinion and Order*, "Amendment of the Commission's Rules to Establish New Personal Communications Services", Jun. 13, 1994, GEN Docket No. 90-314. The *Second Report and Order* and the June 1994 *Opinion and Order* defined the aforenoted licensed bands which were set aside for isochronous operation, intended primarily for circuit oriented voice and data applications. They also defined an unlicensed spectrum between 1910 MHz and 1930 MHz of which the band from 1910 to 1920 MHz is set aside for asynchronous operation, intended primarily for packet data, and the band for 1920 to 1930 MHz is for isochronous operation, again intended for circuits.

Within the licensed band, each licensed service provider need only comply with broad technical rules, employing any one of several candidate technologies in the provision of wireless personal communications services, such as voice and data. Such personal communications services are envisioned to supplement, not replace, current cellular mobile radio systems, which are generally designed for analog voice transmission in a lower frequency band of 824–889 MHz. PACS (personal access communications systems) has emerged as a leading candidate among low-tier systems proposals in the Joint Technical Committee (JTC) of ANSI T1 and T1A. Unlike current high-tier cellular systems, which characteristics include high power (>1 watt), large cell size (radius≈2 miles), and high mobility (up to 100 mph), the characteristics of PACS include low power (<1 watt), small cell size (radius≈200 meters), and low mobility (<40 mph). Advantageously, PACS in the licensed spectrum can provide higher speech quality and lower signal delay than vehicular cellular systems, primarily for pedestrian public access in outdoor and some indoor venues such as shopping malls and airports. For such pedestrian usage, the portable transceivers used by each subscriber must be small, lightweight, and relatively inexpensive. In addition, power consumption must be low to provide long-life between recharging.

In view of the split configuration of the licensed subbands in the licensed spectrum, the PACS proposal uses frequency-division duplexing (FDD) techniques which are best suited to separate uplink transmissions (from a portable handset to a fixed port) from downlink transmissions (from a fixed port to a portable handset). By operating the multiplexed radio links on a time-division multiplexed/time-division multiple access (TDM/TDMA) basis, a number of separate fully duplex demand-assigned digital channels can be provided to allow a number of portables to simultaneously access a single port on a multiplexed basis. Specifically, in the PACS proposed arrangement each port transmits time-division multiplexed (TDM) bit streams on a predetermined downlink carrier frequency, with, in turn, each portable that accesses that port responding by transmitting a TDMA burst on a corresponding uplink carrier frequency (equal to the uplink frequency less the 80 MHz separation between uplink and downlink subbands).

The PACS proposal uses spectrally-shaped quadrature phase shift keying (QPSK) at 192 kbaud (384 kbits/s). Each digital radio frame is 2.5 msec long and comprises 8–312.5 μsec bursts per frame, numbered 0 to 7. This short frame length was chosen for its small round-trip delay, which for speech, eliminates the need for echo control, and for data, allows for the rapid acknowledgement of data packet reception for high data throughput. It also allows channel access and handoff by a portable of an active call to another port to proceed at a rapid pace because measurements can be made faster. The channel data rate was chosen for its tolerance to delay spread.

In a burst window of 120 bits, 80 bits (10 octets) are allocated to the fast channel (FC). The FC provides a raw data rate of 32 kbps, suitable for reasonable quality speech coder. Inter-carrier spacing of 300 KHz is used for both uplink and downlink channels. The power used by the transmitter in the portable will range between 5–10 milliwatts or less on average and provide a range of several hundred to a thousand feet. As such, the resulting low radiated power poses essentially no biological radiation hazard to any user. In addition, the port antenna can be relatively small and suitable for mounting on a utility or light pole. With this transmission range, a port can simultaneously serve typically 20–30 separate locally situated portables. The same TDM downlink channels are reused at ports that are spaced sufficiently far apart to reduce co-channel interference to an acceptably low level but yet conserve valuable spectrum. To provide access to the wireline telephone network, each port is interfaced, typically through a conventional fixed distribution facility, over either a copper or fiber connection to a switching machine at a local central office.

For high performance, a portable in PACS implements microscopic diversity in both receive and transmit operations, which means determining which of multiple transmission paths gives the best signal performance. It has been shown that a 10 dB performance improvement in signal-to-noise ratio can be obtained by employing diversity techniques. Thus, each portable unit includes multiple antennas with the portable's electronics intelligently selecting signals from these antennas to combat the effects of signal fading. Such antenna selection is performed prior to the reception of each burst. In an FDD mode, the selection procedure must be performed at the portable rather than at the port since determination of the preferred antenna must be made based on measurements at the downlink frequencies which are available only at the portable in order to determine over which antenna a "best" quality signal is received. Accordingly, during the period of each downlink frame, between bursts from the port to that portable, time must be allocated for the portable to make measurements of the signals received on both antennas, and the receiver is then switched to the "better" input to receive its intended burst from the port. This is called preselection diversity.

Implicit with the requirement for high performance in PACS is the capability of a portable during an active call to make continuous signal measurements of other radio ports in the system to support mobile-controlled handoffs to another port. Thus, as subscribers move their portable from an area proximate to one port to another closer port, or as changing conditions result in a deteriorated signal quality with the original port and that a port with a better signal quality has an available channel, the switching machine would be suitably programmed to controllably and automatically handoff calls from the original port to the closer or "better" port at the direction and request of the portable. Accordingly, during a period of each downlink frame, between bursts from the port to that portable, time must also be allocated for the frequency synthesizer in the portable to tune to the downlink carrier frequency of a port other than the one it is presently communicating with and make measurements on both antennas at that other port's downlink frequency. After such measurements, the receiver must then retune to its original downlink frequency to receive the next burst from the original port with which it is communicating.

Various aspects of TDMA for PACS have been treated in prior art patents such as U.S. Pat. No. 4,849,991, entitled "Method and Circuitry for Determining Symbol Timing for Time Division Multiple Access Radio Systems," issued Jul. 18, 1989 to H. W. Arnold and N. R. Sollenberger, two of the co-inventors herein; U.S. Pat. No. 4,937,841, entitled "Method and Circuitry for Carrier Recovery for Time Division Multiple Access Radio Systems," issued Jun. 26, 1990 to J. C. Chuang and N. R. Sollenberger; U.S. Pat. No. 4,941,155, entitled "Method and Circuitry for Symbol Timing and Frequency Offset Estimation in Time Division Multiple Access Radio Systems," issued Jul. 10, 1990 also to J. C. Chuang and N. R. Sollenberger; U.S. Pat. No. 5,084,891, entitled "A Technique for Jointly Performing Bit Synchronization and Error Detection in a TDM/TDMA System," issued Jan. 28, 1992 to S. Ariyavisitakul, L. F. Chang (also an inventor herein) and N. R. Sollenberger; U.S. Pat. No. 5,155,742, entitled "Time Dispersion Equalizer Receiver with a Time-Reversal Structure for TDMA Portable Radio Systems", issued Oct. 13, 1992 to S. Ariyavisitakul and H. W. Arnold; U.S. Pat. No. 5,177,769, entitled Digital Circuits for Generating Signal Sequences for Linear TDMA Systems", issued Jan. 5, 1993 to H. W. Arnold and N. R. Sollenberger; U.S. Pat. No. 5,212,831, entitled "Method and Apparatus for Autonomous Adaptive Frequency Assignment in TDMA Portable Radio Systems", issued May 18, 1993 to J. C. Chuang and N. R. Sollenberger; U.S. Pat. No. 5,222,101 entitled "Phase Equalizer for TDMA Portable Radio Systems", issued Jun. 22, 1993 to S. Ariyavisitakul and H. W. Arnold; U.S. Pat. No. 5,226,045 entitled "Method and Apparatus for Autonomous Selective Routing During Radio Access in TDMA Portable Radio Systems", issued Jul. 6, 1993 to J. C. Chuang; U.S. Pat. No. 5,333,175, entitled "Method and Apparatus for Dynamic Power Control in TDMA Portable Radio Systems", issued. Jul. 26, 1994 to S. Ariyavisitakul, J. C. Chuang and N. R. Sollenberger; U.S. Pat. No. 5,363,375, entitled "Method and Apparatus for Synchronizing Timing Among Radio Ports in Wireless Communications Systems Using Hierarchical Scheme", issued Nov. 8, 1994 to J. C. Chuang and N. R. Sollenberger; and U.S. Pat. No. 5,363,376, entitled "Method and Apparatus for Synchronizing Timing Among Radio Ports in Wireless Communications Systems", also issued Nov. 8, 1994 to J. C. Chuang and N. R. Sollenberger.

As aforenoted, the FCC it its *Second Report and Order* of October 1993 and its *Memorandum Opinion and Order* of June 1994 also created a 10 MHz wide band from 1920 MHz to 1930 MHz for isochronous or circuit based unlicensed wireless access. It is envisioned that PACS in the unlicensed band (PACS-UB) could be used for wireless Centrex, or PBX applications, as well as private residential applications. For such residential applications, PAC-UB could replace present cordless telephone sets, but with better range and voice quality than is provided in the frequency band of presently available cordless units. A primary requirement for any such PACS-UB system is their compliance to new FCC Rules in Part 15, Subpart D, which define an "etiquette" by which unlike systems can make common use of the allocated spectrum. Such Rules have two principal goals: to enable emerging technologies to be deployed in a coordinated fashion with existing microwave systems which currently use that spectrum (until the spectrum is cleared); and to enable unlike systems to reasonably share the same spectrum. Among the various constraints and requirements of the Rules is a maximum transmit power level, which limits PACS-UB to primarily indoor use.

The Rules do not require a conforming system to operate in a time-division duplex (TDD) mode in which separate time-slots at the same carrier frequency are used for uplink and downlink transmissions. However, only TDD systems can feasibly operate in the unlicensed band, because sufficient frequency duplex separation is not available to isolate the transmissions in each direction. Although the Rules do not require that a portable handset be compatible for operation in both the licensed spectrum and the unlicensed spectrum, interoperability of portable handsets between the licensed and unlicensed bands is encouraged to enable a subscriber to the licensed band to use his same handset within a local environment in the unlicensed band. Such a subscriber, who will pay service providers for "air time" for his usage in the licensed band, will not have such charges associated with his access of the unlicensed band when accessing the telephone network, as cordless telephone users do not now. Thus, unlike current cellular telephone subscribers who may use their cellular telephone from their home to make a local call and are charged air-time for the such a call, PACS subscribers may use their handset within their home, if equipped with an unlicensed band terminal, without being charged by their licensed band service provider. Also, use of the unlicensed band has much more attractability from a cost basis if a portable handset can also operate in the licensed band. Interoperability of portable handsets between the two bands will also encourage manufacturers to manufacture equipment for use in the unlicensed band, which without such interoperability they may not be so stimulated to do.

In order to be compatible in both the licensed and unlicensed bands, a portable handset must be capable of operating in both and FDD and TDD modes. An overall design objective for both modes of operation is, however, low cost, low complexity, and high performance. It is thus necessary to use a design incorporating a major reuse of hardware for both modes of operation, but which still provides required high performance.

A critical component in a hardware design of a portable handset for use in either the FDD mode or TDD mode is a frequency synthesizer. In the TDD mode, during an active call the same frequency is used on the uplink and downlink channels. Within each frame period, however, measurements must be made on other channels for purposes of determining whether handoff to another port should be made, thus requiring retuning of a synthesizer to at least one other another channel in a frame. In the FDD mode during an active call, and within each frame period, separate uplink carrier and downlink carrier frequencies must be generated for transmitting and receiving the bursts to and from the port with which the portable is communicating. In addition, within each frame, retuning to at least an additional downlink carrier frequency for handoff procedures is also necessary. Thus multiple carrier frequencies are required within the short time period of a frame, requiring either a fast-switching synthesizer or multiple synthesizers, either of which would add significant complexity and cost to the portable. These solutions negate the design objectives. A radio design that could accommodate a less expensive slow-switching synthesizer is therefore desirable.

In addition to the synthesizer tuning that must be performed that can occupy a significant portion of the frame period, time must be allocated in each frame period for the aforementioned diversity measurements for desired high performance. By using a frame structure having a longer duration, the required tuning functions and the diversity measurements could easily be accommodated. A short frame duration has many advantages, however. These include: the absence of any echo control requirement; a rapid speech recovery on errors; the support of higher user velocities during operation; fast call setup and handoffs; and for data transmission, low-delay error retransmission. Thus, concomitant with a longer frame duration would be poor quality.

An object of the present invention is to provide a low-complexity, high-performance portable handset design for PACS that is compatible for operation in both the licensed and unlicensed portions of the Emerging Technologies frequency band.

SUMMARY OF THE INVENTION

The portable handset of the present invention is operable in both an FDD and a TDD mode and is thus compatible for operation in both the licensed and unlicensed bands of the Emerging Technologies band allocated by the FCC. Advantageously, the circuitry in the receive and transmit portions of the handset is shared for both modes of operation, and is high-performance, low-complexity and low-cost. This is accomplished by using similar time-multiplexed periodic frame structures for both modes and a single frequency synthesizer that does not have to switch quickly between frequencies.

The portable handset incorporates receive and transmit circuitry that operates at fixed intermediate frequencies (IF) that are separated by the carrier difference between corresponding uplink and downlink carriers in the FDD mode. In the FDD mode, a single synthesizer frequency, when mixed with the transmit circuitry IF frequency, produces the uplink frequency while that same synthesizer frequency, when mixed with the downlink frequency, produces the receiver IF frequency. Switching of synthesizer frequencies, therefore, is not required within each frame between transmitting and receiving a burst. Synthesizer switching is thus only required for handoff measurements. In the TDD mode on the other hand, bursts are transmitted to and received from a port during an active call on the same carrier frequency. Since the receive and transmit circuitry operate at different IFs, however, the synthesizer must actually switch frequencies within each frame between transmitting and receiving a burst at the same carrier frequency, which is counter to what is expected for a TDD mode of operation. Such frequency switching within each short duration frame in the TDD mode would appear to create the same afore-described problem with multiple switching in the FDD mode. Since, however, transmit and receive carriers are the same, TDD diversity can be performed at the port rather than the portable, thereby freeing the time in each frame in the FDD mode that is used for diversity measurements. This time is then available in each frame in the TDD mode for switching of the synthesizer frequency between transmit and receive time slots.

DETAILED DESCRIPTION

Figure 1:
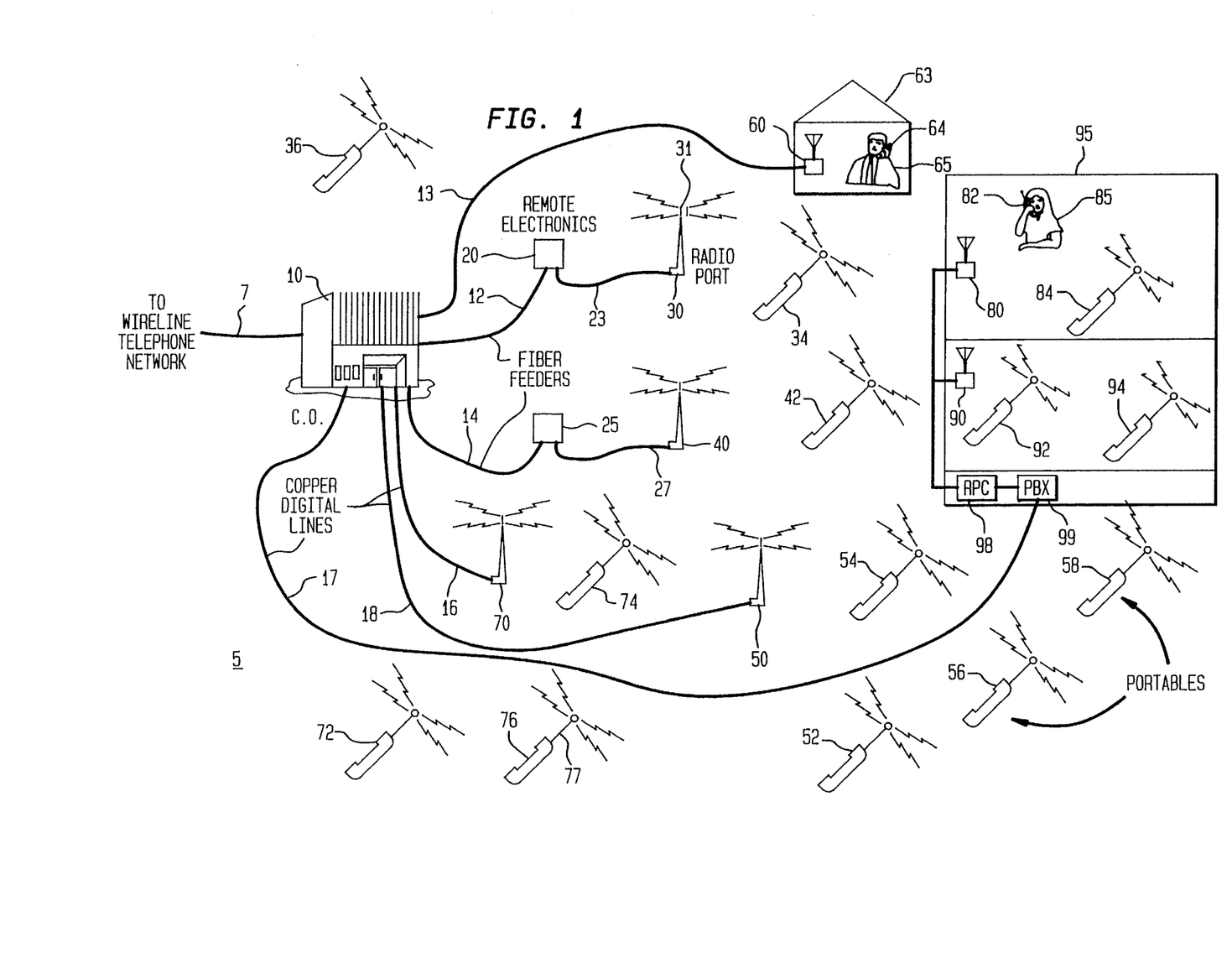
FIG. 1 shows a portable wireless communications TDM/TDMA digital telephony system having ports that operate in both the licensed and unlicensed spectrums.

An overall diagram of a low power licensed/unlicensed portable wireless communications TDM/TDMA digital telephony system 5 is shown in FIG. 1. In both the licensed and unlicensed modes, low power digital portable telephony utilizes fixed base units, referred to as ports, and a number of mobile transceiver handsets, referred to as portables. For licensed service, a service provider is licensed by the FCC to provide wireless telecommunications services within a specific frequency band and within a defined service area. That service provider's subscribers will be able through their portable to access a port, and through that, the wireline telephone network, to both initiate and receive telephone calls. Although different service providers may utilize different technologies, the afore-described PACS technology utilizes time division multiple access (TDMA), to enable a portable to access a port through a separate demand-assigned TDMA frequency channel to carry duplex communication on a time division multiplexed (TDM) basis there between. As previously described, downlink transmission from a port to a portable is in digital format at the port's assigned downlink frequency in the licensed spectrum in the downlink band at a frequency between 1930 and 1990 MHz. The portable digitally transmits in bursts to that same port in the uplink band between 1850 and 1910 MHz at a frequency that is 80 MHz below the downlink frequency. By utilizing TDM/TDMA, each port can simultaneously communicate with multiple portables in different time slots of a frame.

The power used by the transmitter in each portable will range between 5–10 milliwatts or less on average and provide a range of several hundred to a thousand feet between a port and each of its portables. To accommodate a relatively large service area, several ports are used with individual calls being successively handed off from port to port as their corresponding callers carry their portables from the coverage area associated with one port to that of an adjacent port. An appropriate switch (not shown) which is located within a local central end office is suitably programmed to controllably handoff calls from port to port as the callers transit corresponding local coverage areas associated therewith.

When the user is in the confines of his home or office, a compatible portable handset will also operate in the unlicensed frequency spectrum between 1920 and 1930 MHz. As aforenoted, within this spectrum, frequency duplexing of uplink and downlink transmissions is not possible. Rather, time-division duplexing (TDD) is the only feasible method of operation that can be be used to separate uplink and downlink transmission. Thus, uplink and downlink transmissions occur on the same frequency channel within that band but in different time-slots. Since no service provider has exclusive rights within the unlicensed spectrum, multiple users of possibly different service providers may be simultaneously competing for use of available frequencies and time-slots. The FCC has promulgated rules that define access criteria which must be satisfied by any device before communication begins to both prevent interference with fixed microwave systems that may be using the same spectrum, and to measure the interference in the time/frequency window in which any port/portable intends to operate. These access criteria are not part of the present invention and will not be discussed further herein.

When a portable handset that is compatible in both the licensed and unlicensed modes is turned-on, its likely operational procedure will be to scan the unlicensed band for suitable ports in that band with which access can be made. This means: (a) determining whether there is a port in the unlicensed band within range with which communication could occur (i.e., determining whether the handset can "see" a port with power greater than a predetermined threshold); and (b) determining whether the portable has permission rights at that port (i.e., determining whether that port and portable unit are properly associated with each other). If the portable is not within range of a port in the unlicensed band with which access can be made, the portable will then scan the licensed band within the spectrum of its user's service provider to locate a port with which it can register itself. Once registered in the unlicensed band, a portable is ready to receive calls directed to it through that port, or to place calls through that port. A portable, when turned on, thus always "knows" whether it operating in the licensed or unlicensed band, and thus whether it should be in an FDD or TDD mode. In the description that follows, it will be assumed that the portable handset "knows" whether it is in a TDD or FDD mode, and the procedures and apparatus for determining which mode it is in need not be detailed any further since they are not part of the present invention.

With reference to FIG. 1, system 5 contains four ports, 30, 40, 50, and 70, that operate in the licensed band; and three base stations, or ports, 60, 80 and 90, that operate in the unlicensed band. Port 60 is located within a residence 63 and ports 80 and 90 are located on different floors of an office building 95. Portables 34 and 36 are associated with port 30; portable 42 is associated with port 40; portables 52, 54, 56 and 58 are associated with port 50; and portables 72, 74 and 76 are associated with port 70. Within residence 63, portable 64 is associated with port 60; and within office building 95, portables 82 and 84 are associated with port 80, and portables 92 and 94 are associated with port 90. The ports themselves are connected to the switch located within central office 10 to provide access to a wireline telephone network. This connection can typically occur in one of two ways: either through copper digital lines 16 and 18 for illustratively ports 70 and 50, respectively, or via intermediary copper digital lines 23 and 27 to remote electronics 20 and 25 for illustratively ports 30 and 40, respectively. The remote electronics contain fixed distribution and concentration facilities for multiplexing traffic, in addition to that provided by ports 30 and 40, onto fiber feeders 12 and 14 which, in turn, feed central office 10. Port 60 can be connected to central office 10 via a POTS line 13, and ports 80 and 90 are connected through a radio port controller 98 to a PBX 99 within building 95 and thereafter over a copper digital line 17 to central office 10. Radio port controller 98 performs the functions of wireless handoffs and assignment of channels in the unlicensed band. The switch located within the central office is connected, through trunk 7, to the wireline telephone network.

Within the licensed band, ports 30, 40 and 50 transmit time division multiplexed (TDM) bit streams on a predefined carrier frequency using quadrature phase shift keying (QPSK) modulation, with an inter-carrier spacing of 300 KHz. The same TDM channels are reused at different ports that are spaced sufficiently far apart, such as ports 30 and 70, to reduce co-channel interference to an acceptably low level but yet conserve valuable spectrum. However, adjacent ports are situated sufficiently close together in order to provide an appropriate degree of overlap of their respective service areas thereby ensuring no loss of coverage occurs during call handoff. Furthermore, each port utilizes a suitable antenna, such as antenna 31 for port 30, to carry its TDM transmissions to its associated portables and to receive TDMA bursts therefrom. Given the carrier frequencies being used, each of these antennas is relatively small and suitable for mounting on a utility or light pole or within an office building.

Inasmuch as system 5 replaces local copper drops and telephone cords with short range low power radio links, ambulatory callers are provided with completely tetherless access. Within his residence user 65 can use his portable 64 to place and receive calls through his base unit 60, as he would now with a presently available cordless telephone. While communicating over the unlicensed spectrum within the range of his port, the user would be charged only for calls as if he were placing them from a wired handset. Communications between the port 60 and the handset 64 are in digital bursts in time-divisioned manner using TDD to separate each direction of transmission. When user 65 leaves his residence, however, his portable handset would automatically register with his PACS service provider at likely his nearest port 31. Calls placed to or by him would then be in bursts in a time-divisioned manner in an FDD mode to separate the uplink and downlink transmission. As user 65 roams his service area, access will be maintained through either this same port 31 or through another port that he might get closer to. Also, during a call, if transmission conditions change causing his signal quality to deteriorate, or if he should get out of range of his original home port, his ongoing conversation will be handed over to another port that can offer a better quality connection.

In a similar manner user 85 within office building 95 is associated with port 80 on her floor in a TDD mode. Should she travel to the floor below, her handset would be associated with port 90. She can thus travel through the building with her portable handset, thereby maintaining continuity with ongoing conversations and availability for incoming calls. Should she leave the building and travel throughout her service area, her same handset would continue to provide a means for accessing the wireline network through anyone of the ports 30, 40 or 50.

In the outdoor environment in the licensed spectrum, as one of the portable users desires to connect to the telephone network, that person's portable must select a channel and initiate an access protocol. Selecting a channel (i.e. a port with which to communicate) requires determination of the "best" port having a vacant time slot. A "best" port is one determined by the portable to have the highest signal to impairment (SIR) ratio or other quality measure. Generally, this is likely to be that port which is closest to the portable. Thus in FIG. 1, portable 74 would most likely access port 70. Various topological and meteorological conditions, however, can affect the quality of transmission so that the nearest port may not be the "best" port for a portable to access. Therefore, in FIG. 1, the "best" port for portable 74 may not be the nearest port 70, but may rather be port 40 or port 50. The "best" port may also not be available. Although the system shown in FIG. 1 shows only a limited number of portable units associated with each port, in actual practice, however, many more portables may be communicating through a port in a particularly high traffic area thereby occupying all the vacant time slots on the channel. The "best" port with respect to signal quality may not, therefore, be the "best" available port. The aforenoted U.S. Pat. No. 5,226,045 issued Jul. 6, 1993 discloses a method and apparatus for selecting a "best" available port.

Figure 2A:
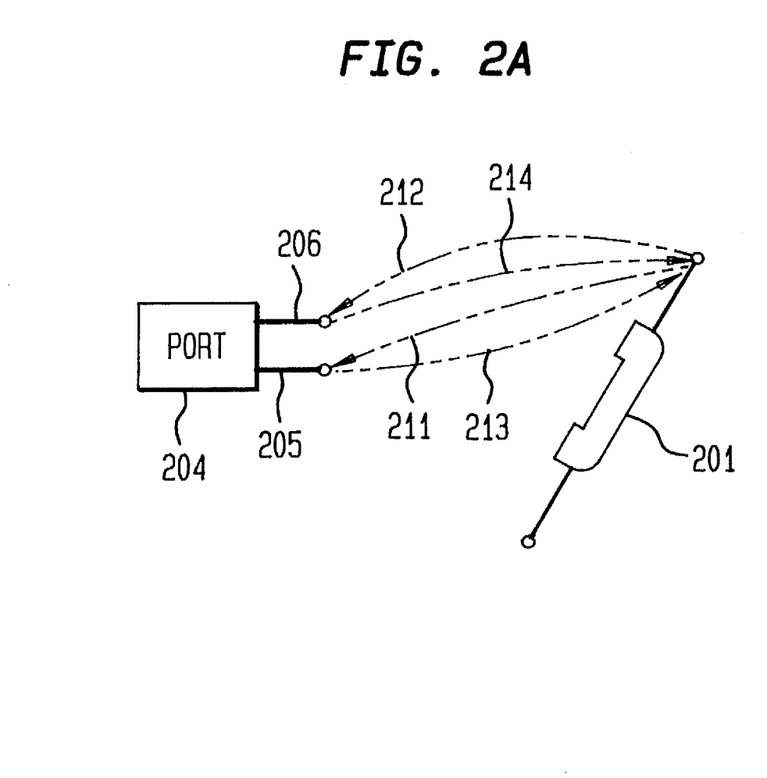
FIG. 2A and 2B show a port and portable handset operating in the FDD and TDD modes, respectively.

In order to meet the objective of high performance, PACS in either the unlicensed or licensed bands provides microscopic diversity. As aforenoted, this means selecting the one of plural signal paths on which the signal-to-noise ratio is highest. It has been shown that a 10 dB improvement in signal-to-noise ratio can be achieved using two antennas separated by at least $\lambda/2$, which is ≈3 inches for a 2 GHz carrier signal. FIG. 2A shows a portable handset 201 which includes two antennas 202 and 203. Since receiver 204 is always receiving signals from multiple portables and must simultaneously perform measurements and signal detection processes, it includes duplicate receivers (not shown), each one of which is associated with a separate antenna 205 and 206. For each uplink burst received from each portable, the one having the highest signal-to-noise ratio is selected.

In the FDD mode, the uplink and downlink frequencies are different. Since the factors that deleteriously affect signal quality, such as signal fading, are frequency dependent, diversity based on measurements made at the port at an uplink frequency cannot be used to select a "best" path to the portable at a downlink frequency. Therefore, in the FDD mode, portable 201 must make diversity measurements to determine for each received burst whether the signal received on antenna 203 over signal path 207 from one preselected port antenna 205, or the signal received on antenna 202 over signal path 208 from the same preselected port antenna, yields the highest signal-to-noise ratio. Thus, as will be discussed hereinafter, time is allocated within each frame in the FDD mode for measuring received signals on both antennas 203 and 204.

Figure 2B:
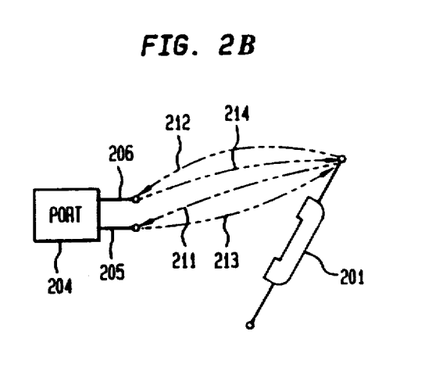

In the TDD mode, uplink and downlink transmissions are on the same frequency. Thus all diversity measurements can be made at the port based on uplink performance and only one antenna is used at the portable, thereby eliminating the time per uplink frame required for multiple measurements. As shown in FIG. 2B, in the TDD mode, port 204 with its two receivers (not shown) can determine whether uplink reception from portable 201 is better on path 211 to antenna 205 or on path 212 to antenna 206. Since the downlink path from port 204 to portable 201 is at the same frequency, this uplink determination is also reflective of performance factors, such as fading, on the downlink. The next burst from port 204 to portable 20 1 is then transmitted from that antenna 205 or 206 over path 213 or 214, respectively, which received the "best" uplink signal. Accordingly, in the TDD mode, time need not be allocated by the portables in each uplink frame for diversity measurements.

As previously discussed, an FDD/TDD compatible portable handset in the FDD mode transmits an RF signal at one uplink frequency in the upper licensed band and receives an RF signal signal at a corresponding downlink frequency in the lower licensed band that is 80 MHz below the uplink frequency. In the TDD mode, the handset both transmits and receives an RF signal at the same frequency in the unlicensed band. In order to maximize use of the circuitry in both modes of operation and to minimize cost and complexity, the portable incorporates a single frequency synthesizer that is not required to fast-switch frequencies between transmitting uplink and receiving downlink in the FDD mode, but rather has relatively relaxed switching requirements within the range of conventional single-loop phase-locked loop (PLL) synthesizers. Since the time within a portable's uplink frame available to switch frequencies is limited due to the diversity and handoff measurements that must be performed, a fast-switching synthesizer would otherwise be required to switch frequencies between transmitting and receiving each burst. A fast-switching synthesizer would, however, add considerably to the cost of the portable, negating the low-cost design objective.

Figure 3:
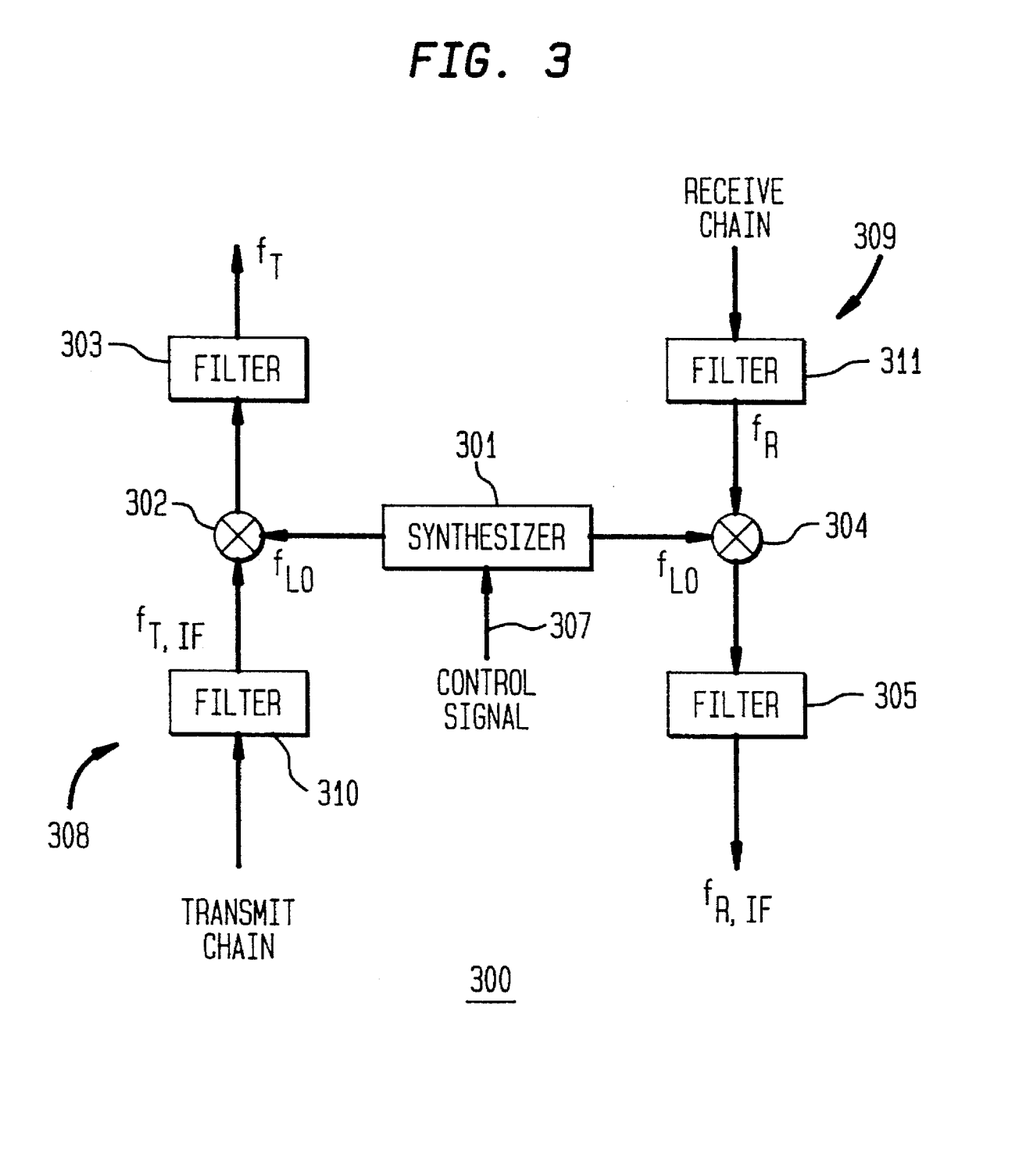
FIG. 3 is a block diagram of the front-end circuitry of a portable handset.

In order to avoid fast-switching of the frequency of the synthesizer in the portable in the FDD mode between transmitting and receiving a burst, the portable incorporates transmitter and receiver circuitry designed to operate at different IF frequencies which, as will be shown, must be separated by the 80 MHz difference between corresponding uplink and downlink RF signals. The front end arrangement 300 of a portable is shown in FIG. 3. Synthesizer 301, which is controlled in frequency by a control signal on input 307, outputs a signal having frequency $f_{LO}$. In the transmit chain 308, the IF circuitry (not shown) produces a signal, which when filtered by filter 310 to remove spurious signal components, is the desired IF signal at frequency $f_{T,IF}$. This IF signal, when mixed by mixer 302 with the synthesizer signal at frequency $f_{LO}$ and filtered by filter 303 to remove out-of-band components, produces the RF signal to be transmitted uplink to the port at frequency:

$$f_T = |f_{LO} - f_{T,IF}|. \tag{1}$$

In the receive chain 309, filter 311 filters signal components that are out of the downlink band. The resultant downlink RF signal at frequency $f_R$ is then mixed by mixer 304 with the synthesizer frequency $f_{LO}$. The resultant signal is filtered by filter 305 to to pass only components at the receiver IF at frequency:

$$f_{R,IF} = |f_{LO} - f_R|. \tag{2}$$

This implies that:

$$f_R - f_T = |f_{R,IF} - f_{T,IF}|. \tag{3}$$

Since the difference between corresponding uplink and downlink carrier frequencies, $f_R - f_T$ is equal to 80 MHz, the difference between the IF frequencies for a portable's transmit and receive circuitry must be equal to that same 80 MHz. Thus, for example, if circuitry in the receive chain is designed to operate with an IF signal of 70 MHz, the circuitry in the transmit chain is designed to operate at an IF signal of 150 MHz. If the portable is communicating with a port having a downlink signal at 1955 MHz and a corresponding uplink signal at 1875 MHz, the frequency $f_{LO}$ of synthesizer 301 would be tuned to 2025 MHz. This frequency when mixed with the transmit IF frequency, $f_{T,IF}$ of 150 MHz yields the desired uplink frequency of 1875 MHz, and when mixed with the received downlink frequency, $f_R$, of 1955 MHz, yields the receive chain IF frequency, $f_R$, of 70 MHz. Thus, synthesizer 301 need not switch frequencies in order to transmit and receive bursts to and from its associated portable within each frame.

Figure 4:
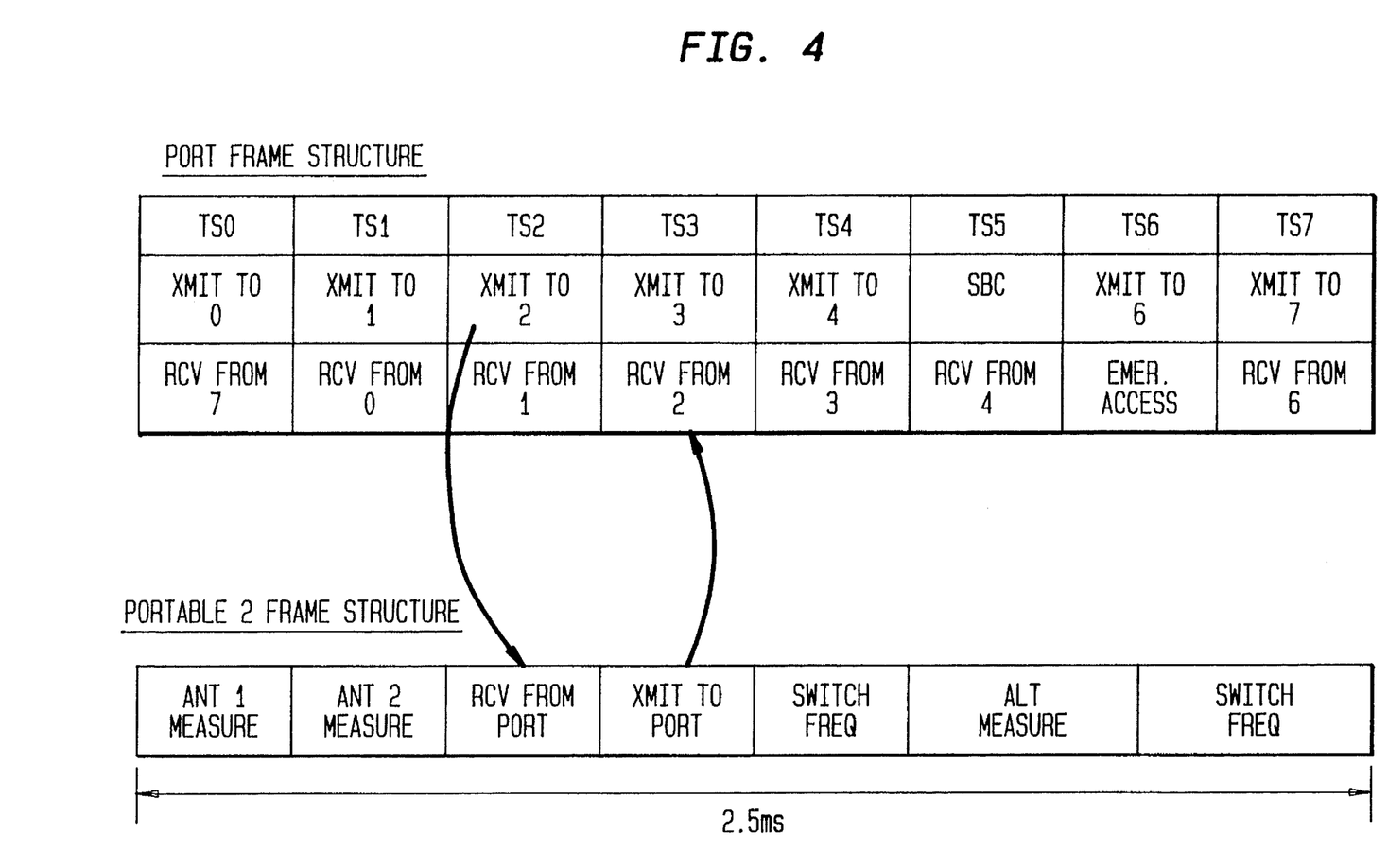
FIG. 4 shows the frame structures for a port and a portable handset communicating with each other in the FDD mode.

FIG. 4 shows the frame structure for a port and one portable communicating with that port for FDD operation in the licensed spectrum. Each transmit port frame of 2.5 msec has eight time-slots, numbered TS0 through TS7, allowing the port to transmit on a time-division basis to up to seven portables with one time-slot, TS5, being reserved as a System Broadcast Channel to provide paging and other information to all portables. Similarly, on the associated port uplink frame, the port receives bursts from the seven portables with which it is communicating, with TS5 being reserved for emergency call access. Each time-slot in both the port and portable frames is 120 bits of which an 80 bit segment is the transmitted burst between the portable and the port and 15 bits are error detecting bits. The corresponding frame structure for a portable communicating in TS2 shows the portable making diversity measurements on both of its antennas and then receiving on the antenna having the highest measured signal-to-noise ratio or other measure of signal quality. The portable is then immediately ready to transmit uplink to the port since the synthesizer need not switch frequencies. After transmitting, the synthesizer switches its frequency to make an automatic link transfer (ALT) signal measurement from another port for hand-off purposes. As noted, the time required for the conventional synthesizer to switch frequencies is approximately one time slot. After the ALT measurement the synthesizer switches its frequency back to its original frequency to receive the next burst from the port with which it is communicating. In subsequent frames, ALT measurements are cyclically made at each of the different port frequencies in order to determine to which port, if any, handoff should be made.

As can be noted, there is no time within the portable's frame structure that would allow for additional frequency switching of the synthesizer without restricting the ability of the portable to make diversity and handoff measurements which would seriously affect performance. The afore-described front-end arrangement thus allows bursts to be received and transmitted without requiring switching of the synthesizer frequency between uplink and downlink bursts.

To maximize circuit efficiency and thereby minimize cost, the compatible handset uses the same receiver and transmitter circuitry for both the FDD and TDD modes. Thus for TDD operation, the transmit and receive IF frequencies are separated by the 80 MHz difference between uplink and downlink signals in the FDD mode. Thus, for TDD operation in which the transmit and receive RF carrier signals are the same, the synthesizer must switch frequencies within each frame between transmitting and receiving a burst, which is opposite to what would be expected for TDD operation. As previously discussed, diversity measurements are not required at the portable for operation in the unlicensed band in a TDD mode. With a frame structure having a duration equal to the duration of the frame in the FDD mode, each TDD frame, therefore, has sufficient time to switch the synthesizer frequency. Thus, although the portable in the TDD mode transmits and receives on the same frequency, synthesizer 301 in FIG. 3 switches its frequency between transmitting and receiving a burst in order to transmit and receive at the same carrier frequency. Continuing the example above, if transmitting and receiving in the unlicensed band at a carrier frequency of 1925 MHz, synthesizer 301 would be tuned to 2075 MHz to transmit a burst at 1925 MHz with a transmitter IF signal of 150 MHz, and must be retuned to 1995 MHz to receive a burst at that same 1925 MHz frequency that is to be down-converted to the receiver IF of 70 MHz.

Figure 5:
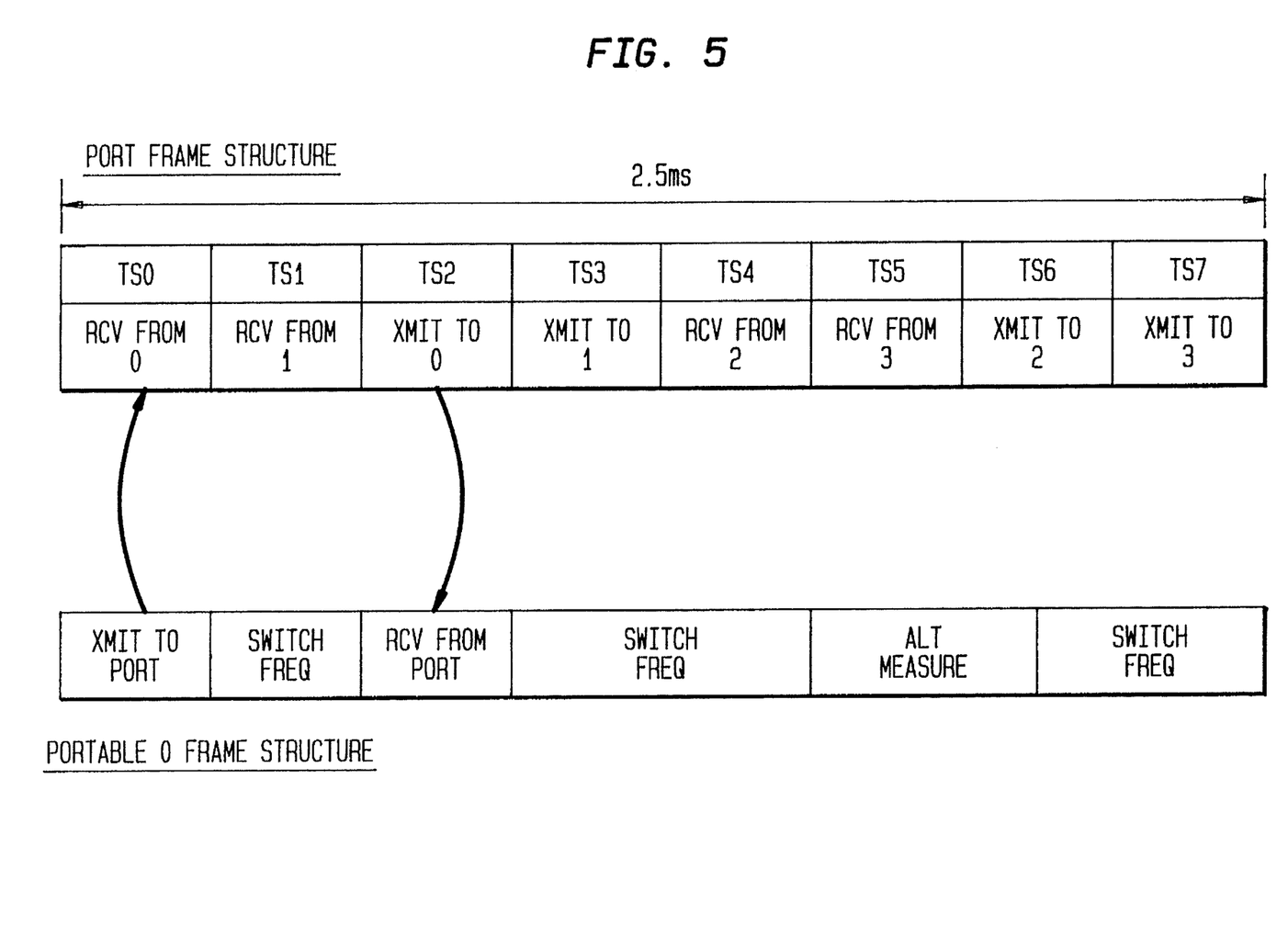
FIG. 5 shows the frame structures for a port and a portable handset communicating with each other in the TDD mode.

FIG. 5 shows the port and portable frame structures for operation in the unlicensed spectrum in a TDD mode. The 2.5 msec frame structure is common with that used in the FDD mode and includes eight time-slots, numbered TS0 through TS7, as in the licensed FDD mode. The port frame structure of eight time-slots supports four time-duplexed channels. As noted, in time-slots TS6 and TS7, the port sequentially receives a pair of bursts from portables 0 and 1, and then sequentially transmits two bursts to these two same portables in time-slots TS0 and TS1. In time-slots TS2 and TS3, bursts are received from portables 2 and 3 and in time-slots TS4 and TS5, bursts are transmitted to portables 2 and 3. The corresponding frame structure for portable 0 is also shown in FIG. 5. As in the licensed mode, each time-slot in the port and portable frame structures is 120 bits of which an 80 bit segment is the transmitted burst between the portable and the port and 15 bits are error detecting bits. As noted, in a first time-slot, the portable transmits the burst that is received in the port's time-slot TS6. Frequency synthesizer 301 is thus tuned to up-convert the IF associated from the portable's transmitter circuitry to the RF carrier in the unlicensed band at which communication has been established between the port and portable. Within the time period of the second time-slot, synthesizer 301 switches its frequency in order to down-convert that same RF carrier to the IF associated with the portable's receiver circuitry. The burst transmitted in the port's time-slot TS0 is then ready to be received in the portable's third time-slot. During the remaining portable frame time the synthesizer switches frequency again to make an ALT measurement at another carrier frequency, performs the measurement, and then switches the frequency of the synthesizer back to transmit the next burst to the port in its next frame. Since, as previously described, diversity measurements need not be performed at the portable in the TDD mode, but are performed at the port, the portable has sufficient time to switch synthesizer frequencies between transmitting and receiving a burst within the frame.

Figure 6:
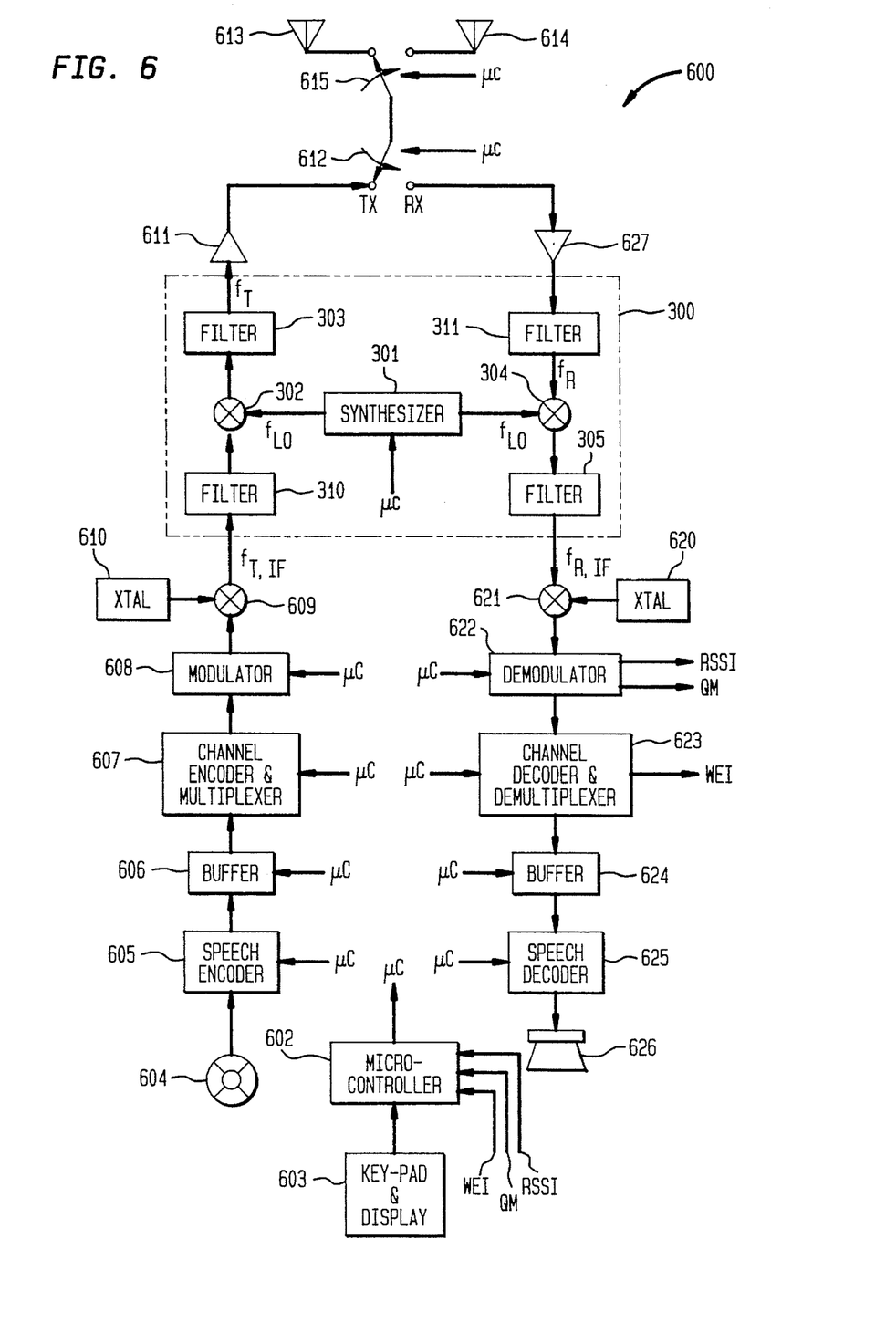
FIG. 6 is a block diagram of a portable handset that is compatible for operation in both an FDD and TDD mode.

FIG. 6 is a schematic block diagram of a portable handset 600 that is compatible for operation in both the TDD mode for use in the in the unlicensed band and in the FDD mode for use in the licensed band. Handset 600 incorporates the front end circuitry 300 described hereinabove. The numerical references to the components of front end circuitry 300 are the same as used in FIG. 3. A microcontroller 602 controls the scheduling and functioning of the individual circuit elements within handset 600. Based on the previously described scanning procedures, at handset turn-on microcontroller 602 "knows" whether to operate in an TDD or FDD mode. Thus, once the determination of whether the handset is in the TDD or FDD mode is made and timing is derived, microcontroller 602 controls the switching or not of the frequency of synthesizer 301 at the appropriate times within each frame in accordance with the portable frame structures shown in FIGS. 4 and 5 for purposes of both transmitting and receiving a burst and for making ALT measurements. Since the frame structures for both modes are similarly formatted having a common number of time-slots per frame, bits per time slot, bits per burst, and a common error detecting code, the baseband coding and decoding circuitry is essentially transparent to whether the portable is operating in the FDD or TDD mode. Thus, by including within microcontroller 602 both TDD and FDD programs, which are automatically loaded depending upon the detected mode of operation, all transmitting and receiving processing functions can proceed automatically.

A user may initiate a call through key-pad/display 603, which is connected to the microcontroller 602. A call is established through setup procedures not part of the present invention and not described herein. Once established, the user's speech is input to microphone 604 and the resultant analog speech signal is encoded by speech encoder 605 and stored in buffer 606. Channel encoder and multiplexer 607, in response to timing signals from microcontroller 602, outputs the coded speech signal and associated signaling information in fixed length bursts for inclusion in the uplink frame at the appropriate time. As can be seen in the portable frame structures for the TDD and FDD modes, the time within the frame at which a burst is transmitted to the port is dependent upon in which mode the portable handset is operating. Since microcontroller 602 "knows" in which mode the handset is operating, it controls the timing of transmission of the burst.

The resultant output burst is modulated by modulator 608 to produce a baseband signal. The baseband signal is up-converted to the transmit chain's IF frequency by mixing it through mixer 609, with the fixed frequency output signal of a crystal oscillator 610. The front end circuitry 300 up-converts the IF frequency signal to the RF carrier uplink signal at the uplink frequency associated with the port through which the portable has established communication. This RF signal is then amplified for transmission by power amplifier 611. Switch 612, controlled by microcontroller 602 for transmitting and receiving, supplies the amplified RF signal to either antenna 613 or 614 through switch 615, the latter also controlled by microcontroller 602. As afore-described, in the TDD mode, one antenna is used both to transmit and receive. In the FDD mode, however, diversity is performed at the portable and the antenna over which transmission is made is determined based on a comparison of downlink signal quality measurements made through each antenna. Thus, in the FDD mode, for each burst, switch 615 is connected by microcontroller 602 to that particular antenna through which in that same frame the "best" signal was measured.

The receive chain of handset 600 includes the front end circuitry for down-converting the received RF signal to the IF signal, circuitry for down-converting the IF signal to baseband, and circuitry for demodulating and decoding each burst within each received frame. Thus, the receive chain includes a low-noise amplifier 627 for amplifying the received signal across the band, and the afore-described front-end circuitry 300, which down-converts the received downlink signal to the predetermined and fixed IF at which the handset circuitry operates. A mixer 621 then combines the IF signal with a fixed frequency signal at the output of crystal oscillator 620 to derive a baseband signal. The baseband signal is demodulated by demodulator 622 to produce a bit stream, which includes the all the bits in the frame, including for each burst the transmitted error detecting bits. Demodulator 622 also outputs a quality measure, QM, and a received signal strength indicator measure, RSSI, that characterizes each received burst. As described in the aforenoted U.S. Pat. No. 5,333,175, QM is an indicator of the signal-to-impairments ratio and can be obtained by measuring the difference between the received signal samples and the expected noise-free samples, measured over each received burst. As described in aforenoted U.S. Pat. No. 4,941,155, symbol timing is performed by finding from a sixteen-times oversampled received signal, the particular timing instant which produces the largest vector sum of the X and Y components of expanded and collapsed differential phase angles of the received burst samples. This maximum vector sum is directly related to the signal-to-impairments ratio and serves as the quality measure, QM, of the received burst. RSSI is obtained by integrating the received power over the burst, which includes signal power and interference.

Quality measures QM and RSSI are supplied to microcontroller 602 for processing. The demodulated bit stream is supplied to a decoder and demultiplexer 623. Decoder and demultiplexer 623 detects the burst, decodes the transmitted speech bits from the burst, and separates the associated control bits within the burst. Only those bits associated with the speech signal in the burst portion of the frame are input to a buffer 624. If an error is detected in transmission, decoder 623 also supplies a word error indicator, WEI, to microcontroller 602. A fixed number of speech bits are inputed to buffer 624 from each received burst. These bits are continuously outputted by buffer 624 at a constant rate to speech decoder 625, which converts the coded speech signal to an analog signal, which is outputted to the portable handset's speaker 626.

With reference to FIGS. 4 and 6, in each frame in the FDD mode, switch 612 is connected to receive and switch 615 is sequentially connected to receive over both antennas 613 and 614. During the first two time-slots, the receive chain circuitry "listens" to downlink signals directed to other portables from the port to which it has established communication. From the QM, RSSI and WEI measures determined during both antenna measurement periods, the "best" antenna over which to receive signals is determined. In the third time-slot, switch 615 is connected to that "best" antenna and the burst transmitted by the port in time-slot TS2 is received and decoded by the receive chain circuitry and the quality measures, QM, RSSI and WEI, for that burst are stored by microcontroller 602. In the next time slot, switch 612 is connect to its transmit side and a burst is transmitted by the transmit chain circuitry over the just determined "best" antenna. Since the front end circuitry 300 is ready to transmit an RF signal at an uplink frequency corresponding to the just received downlink frequency, synthesizer 301 need not change frequencies between receiving and transmitting a burst. After transmitting a burst, however, in order to make measurements from other ports for purposes of handoff, the frequency of synthesizer 301 is switched and the RSSI and QM measures of a signal from another port are determined and stored by microcontroller 602. After making a plurality of such ALT measurements, made one each in successive frames, a handoff to another port may be made by comparing the RSSI and QM measures determined during each ALT measurement with those same parameters measured from the communicating downlink signal. In each frame, after an ALT measurement, synthesizer 301 is switched in frequency in preparation for the next frame.

With reference to FIGS. 5 and 6, in the TDD mode diversity measurements at the portable need not be made and switch 615 is connected to either antenna 613 or 614. Within the frame, switch 612 is first connected to transmit a burst at an uplink frequency. Synthesizer 301 is then switched in frequency to receive a burst at that same frequency, for which the quality measures QM, RSSI and WEI are determined. After receiving that burst, the frequency of synthesizer 302 is switched to make an ALT measurement from another port. As in the FDD mode, after a number a frames, handoff to another port may or may not be made. After each ALT measurement, the frequency of synthesizer 301 is again switched in preparation for the next frame.

The above-described embodiment is illustrative of the principles of the present invention. Other embodiments could be devised by those skilled in the art without departing from the spirit and scope of the present invention.

What is claimed is:

1. In a TDM/TDMA digital telephony system having a plurality of fixed ports and a plurality of mobile portable handsets, each of said ports having a transmitter for transmitting a downlink burst signal at one of a plurality of downlink frequencies to at least one portable handset and a receiver for receiving an uplink burst signal at one of a plurality of associated uplink frequencies from at least one of said portable handsets, some of said plurality of ports operating in a frequency-division duplex (FDD) mode in a licensed frequency spectrum in which the downlink frequencies and uplink frequencies are in different predetermined frequency bands and each downlink frequency and associated uplink frequency are separated by a predetermined frequency difference, and others of said ports operating in a time-division duplex (TDD) mode in an unlicensed frequency spectrum in which a downlink frequency and its associated uplink frequency are the same and a downlink burst and an uplink burst are received and transmitted in different time-slots of a frame, a portable handset that is compatible for operation in an FDD mode for communicating with those ports operating in the FDD mode in the licensed frequency spectrum and in the TDD mode for communicating with those ports operating in the TDD mode in the unlicensed frequency spectrum, the compatible portable handset comprising:

frequency synthesizer means for producing a synthesizer signal at a frequency determined by a control signal;

down-converting means for down-converting the downlink frequency of a received downlink burst signal to a first predetermined intermediate frequency (IF) by mixing it with said synthesizer signal;

receiver circuit means comprising means for converting the down-converted downlink burst signal at said first predetermined IF to a baseband signal, means for demodulating the baseband signal, and means for decoding the demodulated baseband signal;

transmitter circuit means comprising means for encoding a signal to be transmitted, means for modulating to a baseband signal the encoded signal to be transmitted, and means for converting the baseband signal to be transmitted to a signal having a second predetermined IF; the difference in frequency between said first predetermined IF and said second predetermined IF being equal to said predetermined frequency difference;

up-converting means for up-converting the second predetermined IF of the signal to be transmitted to an uplink frequency associated with the downlink frequency by mixing it with said synthesizer signal; and control means for determining whether the portable handset is operating in an FDD or TDD mode and for generating said control signal, said synthesizer being maintained by said control signal at the same frequency for both down-converting the downlink frequency to said first predetermined IF and for up-converting said second predetermined IF to said uplink frequency to keep the separation in frequency between said uplink and downlink frequencies at said predetermined frequency difference when said portable handset is in the FDD mode, and in response to said control signal said synthesizer being switched in frequency between down-coverting the downlink frequency to said first predetermined IF and up-converting the second predetermined IF signal to said uplink frequency in between the different time-slots in each frame to keep said uplink and downlink frequencies the same when said portable handset is in the TDD mode.

2. The compatible portable handset in accordance with claim 1 wherein the licensed spectrum comprises the band between 1850 to 1910 MHz for uplink transmissions and the band between 1930 to 1990 MHz for downlink transmissions, and the unlicensed spectrum comprises the band between 1910 MHz and 1930 MHz.

3. The compatible portable handset in accordance with claim 2 wherein said predetermined frequency difference is equal to 80 MHz.

4. In a TDM/TDMA digital telephony system having a plurality of fixed ports and a plurality of mobile portable handsets, each of the ports having a transmitter for transmitting a downlink burst signal at one of a plurality of downlink frequencies to at least one portable handset and a receiver for receiving an uplink burst signal at one of a plurality of associated uplink frequencies from at least one of the portable handsets, some of the plurality of ports operating in a frequency-division duplex (FDD) mode in a licensed frequency spectrum in which the downlink frequencies and uplink frequencies are in different predetermined frequency bands and each downlink frequency and associated uplink frequency are separated by a predetermined frequency difference, and others of the ports operating in a time-division duplex (TDD) mode in an unlicensed frequency spectrum in which a downlink frequency and its associated uplink frequency are the same and a downlink burst and an uplink burst are received and transmitted in different time-slots of a frame, a method for compatibly operating a portable handset in an FDD mode for communicating with those ports operating in the FDD mode in the licensed frequency spectrum and in the TDD mode for communicating with those ports operating in the TDD mode in the unlicensed frequency spectrum, the method comprising the steps of:

producing a synthesizer signal at a frequency determined by a control signal;

down-converting the downlink frequency of a received downlink burst signal to a first predetermined intermediate frequency (IF) by mixing it with the synthesizer signal;

converting the down-converted downlink burst signal at the first predetermined IF to a baseband signal, demodulating the baseband signal, and decoding the demodulated baseband signal;

encoding a signal to be transmitted, modulating to a baseband signal the encoded signal to be transmitted, and converting the baseband signal to be transmitted to a signal having a second predetermined IF; the difference in frequency between the first predetermined IF and the second predetermined 1F being equal to the predetermined frequency difference;

up-converting the second predetermined IF of the signal to be transmitted to an uplink frequency associated with the downlink frequency by mixing it with the synthesizer signal; and determining whether the portable handset is operating in an FDD or TDD mode and for generating the control signal, the control signal maintaining the frequency of the synthesizer signal at the same frequency for both down-converting the downlink frequency to the first predetermined IF and for up-converting the second predetermined IF to the uplink frequency to keep the separation in frequency between the uplink and downlink frequencies at the predetermined frequency difference when the portable handset is in the FDD mode, and switching the frequency of the synthesize signal in response to the control signal between down-coverting the downlink frequency to the first predetermined IF and up-converting the second predetermined IF signal to the uplink frequency between the different time-slots in each frame to keep the uplink and downlink frequencies the same when the portable handset is in the TDD mode.

5. The method of claim 4 wherein the licensed spectrum comprises the band between 1850 to 1910 MHz for uplink transmissions and the band between 1930 to 1990 MHz for downlink transmissions, and the unlicensed spectrum comprises the band between 1910 MHz and 1930 MHz.

6. The method of claim 5 wherein the predetermined frequency difference is equal to 80 MHz.

7. A portable handset for use in a TDM/TDMA digital telephony system that operates in either a frequency-division duplex (FDD) mode in which the portable handset transmits an uplink signal and receives a downlink signal on uplink and downlink carrier frequencies, respectively, that are separated by a predetermined frequency difference, or in a time-division duplex (TDD) mode in which the portable handset transmits an uplink signal and receives a downlink signal on different time-slots at the same uplink and downlink carrier frequency, the portable handset comprising:

a transmitter having an associated first predetermined intermediate frequency (IF);

a receiver having an associated second predetermined IF, said first and second IFs being separated by said predetermined frequency difference;

frequency synthesizer means for producing a synthesizer signal having an adjustable frequency;

means for up-converting said first predetermined IF to said uplink carrier frequency by mixing it with said synthesizer signal;

means for down-converting said downlink carrier frequency to said second predetermined IF by mixing it with said synthesizer signal;

means for keeping said synthesizer signal at the same frequency for both transmitting the uplink signal and receiving the downlink signal when the portable handset is in the FDD mode, and for switching the frequency of said synthesizer signal between transmitting the uplink signal and receiving the downlink signal when the portable handset is in the TDD mode.

8. The portable handset of claim 7 further comprising means for determining whether the handset is in the TDD or FDD/node.

9. The portable handset of claim 8 wherein its uplink carrier frequency is in the frequency band between 1850 MHz and 1910 MHz and its downlink carrier frequency is in the frequency band between 1930 MHz and 1990 MHz when the portable handset is in the FDD mode, and its uplink and downlink carrier frequency is in the frequency band between 1910 Mhz and 1930 MHz when the portable handset is in the TDD mode.

10. The portable handset of claim 9 wherein said predetermined frequency difference is equal to 80 MHz.

11. In a TDM/TDMA digital telephony system, a method of operating a portable handset in either a frequency-division duplex (FDD) mode in which the portable handset transmits an uplink signal and receives a downlink signal on uplink and downlink carrier frequencies, respectively, that are separated by a predetermined frequency difference, or in a time-division duplex (TDD) mode in which the portable handset transmits an uplink signal and receives a downlink signal on different time-slots at the same uplink and downlink carrier frequency, the method comprising the steps of:

producing a synthesizer signal having an adjustable frequency;

down-converting the downlink carrier frequency of the downlink signal to a first predetermined intermediate frequency (IF) by mixing it with the synthesizer signal;

up-converting a second predetermined IF to the uplink carrier frequency for transmitting the uplink signal by mixing it with the synthesizer signal, the first and second predetermined IFs being separated by said predetermined frequency difference;

keeping the synthesizer signal at the same frequency for both transmitting the uplink signal and receiving the downlink signal when the portable handset is in the FDD mode, and switching the frequency of the synthesizer signal between transmitting the uplink signal and receiving the downlink signal when the portable handset is in the TDD mode.

12. The method of claim 11 further comprising the step of determining whether the handset is in the TDD or FDD mode.

13. The method of claim 12 wherein the uplink carrier frequency is in the frequency band between 1850 MHz and 1910 MHz and the downlink carrier frequency is in the frequency band between 1930 MHz and 1990 MHz when the portable handset is in the FDD mode, and the uplink and downlink carrier frequency is in the frequency band between 1910 Mhz and 1930 MHz when the portable handset is in the TDD mode.

14. The method of claim 13 wherein the predetermined frequency difference is equal to 80 MHz.

\* \* \* \* \*

UNITED STATES PATENT AND TRADEMARK OFFICE
CERTIFICATE OF CORRECTION

PATENT NO. : 5,475,677

DATED : December 20, 1995

INVENTOR(S) : Hamilton W. Arnold, et al.

It is certified that error appears in the above-identified patent and that said Letters Patent is hereby corrected as shown below:

In the drawings,
Sheet 2 of 6, showing Figs. 2A and 2A should be deleted and substituted with with the attached Sheet 2 of 6 showings Figs. 2A and 2B.

Signed and Sealed this

Thirteenth Day of August, 1996

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,475,677
DATED : December 20, 1995
INVENTOR(S) : Hamilton W. Arnold, et al.

Page 2 of 2

It is certified that error appears in the above-indentified patent and that said Letters Patent is hereby corrected as shown below:

FIG. 2A

FIG. 2B